United States Patent [19]

Bogart

[11] Patent Number: 5,055,204
[45] Date of Patent: Oct. 8, 1991

[54] SOIL AND SLUDGE TREATMENT APPARATUS AND METHOD INCLUDING AGITATION, AERATION AND RECIRCULATION

[76] Inventor: John D. Bogart, P.O. Box 717, Mt. Juliet, Tenn. 37122

[21] Appl. No.: 399,989

[22] Filed: Aug. 29, 1989

[51] Int. Cl.⁵ .................... C02F 11/00; B01F 13/02
[52] U.S. Cl. .................... 210/758; 210/195.1; 210/197; 210/219; 210/220; 210/241; 210/805; 210/806; 366/102; 366/107
[58] Field of Search .............. 210/195.1, 201, 205, 210/206, 241, 758, 765, 806, 620, 197, 220, 219, 258, 770, 805, 623, 626, 628, 629; 261/121.1, 124; 280/837; 422/231; 209/3, 9, 12; 417/900; 366/107, 101–104

[56] References Cited

U.S. PATENT DOCUMENTS

| | | | |
|---|---|---|---|
| 2,780,369 | 2/1957 | Kaney | 280/837 |
| 3,715,308 | 2/1973 | Sulfaro et al. | 210/195.1 |
| 3,997,300 | 12/1976 | Boatwright et al. | 261/121.1 |
| 4,046,689 | 9/1977 | Argyll | 210/770 |
| 4,062,654 | 12/1977 | Shigeyasu | 261/121.1 |
| 4,082,672 | 4/1978 | Petroski | 210/241 |
| 4,089,507 | 5/1978 | Arai et al. | 366/102 |
| 4,238,336 | 12/1980 | Bultman | 366/107 |
| 4,536,286 | 8/1985 | Nugent | 210/241 |
| 4,584,102 | 4/1986 | Bogart et al. | 210/620 |
| 4,666,612 | 5/1987 | Hoffman et al. | 210/806 |
| 4,749,497 | 6/1988 | Kanzleiter | 210/241 |
| 4,769,221 | 9/1988 | Marihart | 261/124 |
| 4,879,048 | 11/1989 | Kreyenberg | 209/3 |

FOREIGN PATENT DOCUMENTS

| | | | |
|---|---|---|---|
| 2571319 | 4/1986 | France | 280/837 |
| 57-53292 | 3/1982 | Japan | 210/623 |
| 698654 | 11/1979 | U.S.S.R. | 209/3 |
| 1126315 | 11/1984 | U.S.S.R. | 261/121.1 |
| 2154459 | 9/1985 | United Kingdom | 261/121.1 |

Primary Examiner—Robert A. Dawson
Assistant Examiner—Joseph Drodge
Attorney, Agent, or Firm—Fleit, Jacobson, Cohn, Price, Holman & Stern

[57] ABSTRACT

A mobile soil and sludge treatment apparatus and a method of treating soil and sludge useful in a soil washing process or a biological decontamination of soils and/or sludges. In one embodiment of the invention, a plurality of tanks are mounted on a vehicular trailer for over-the-road movement and each tank includes aerator/mixers and a plurality of peripherally arranged air jets with the mixing, aeration and air jets combining to prevent settling of the solids in the slurry during the decontamination process. In a second embodiment of the invention, a single large tank is mounted on a vehicular trailer with the tank including aerator/mixers and a slurry pump for recirculating the slurry throughout the tank with the recirculating pipes terminating in jet nozzles or eductors which enhance mixing and solids suspension. In a third embodiment, the aeration/mixing is obtained by a plurality of downwardly directed air jet nozzles adjacent the bottom of the tank. The apparatus and method efficiently maintain the suspension of solids in a slurry environment for enhancing solubilizing of contaminants from the solids and producing decontaminated soils.

9 Claims, 4 Drawing Sheets

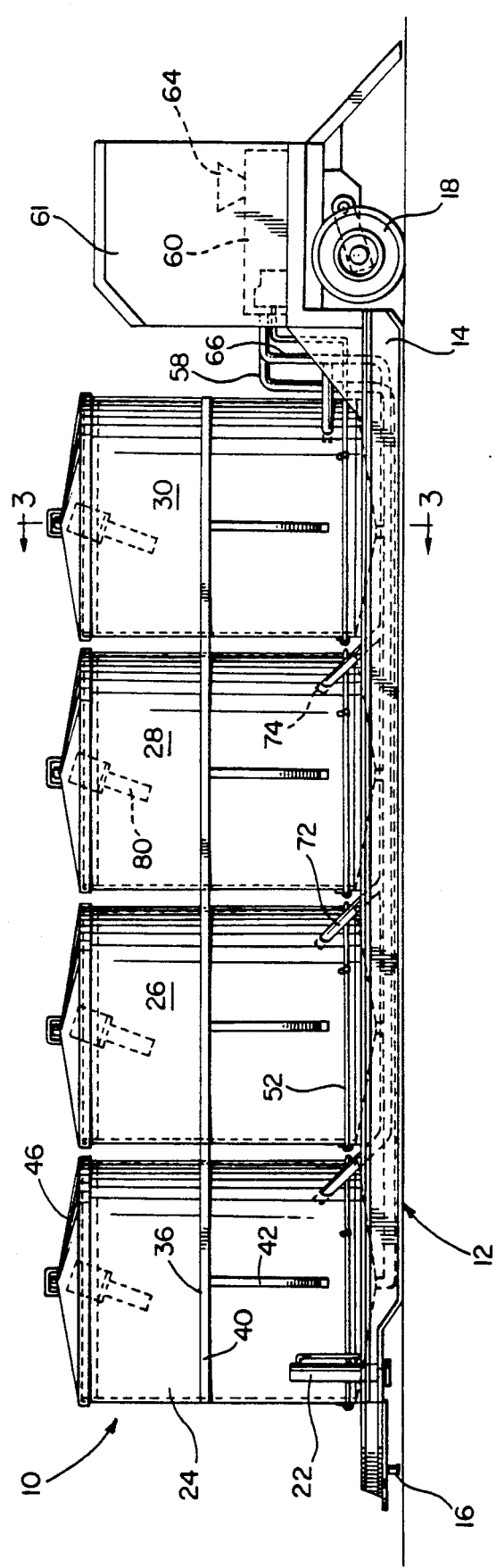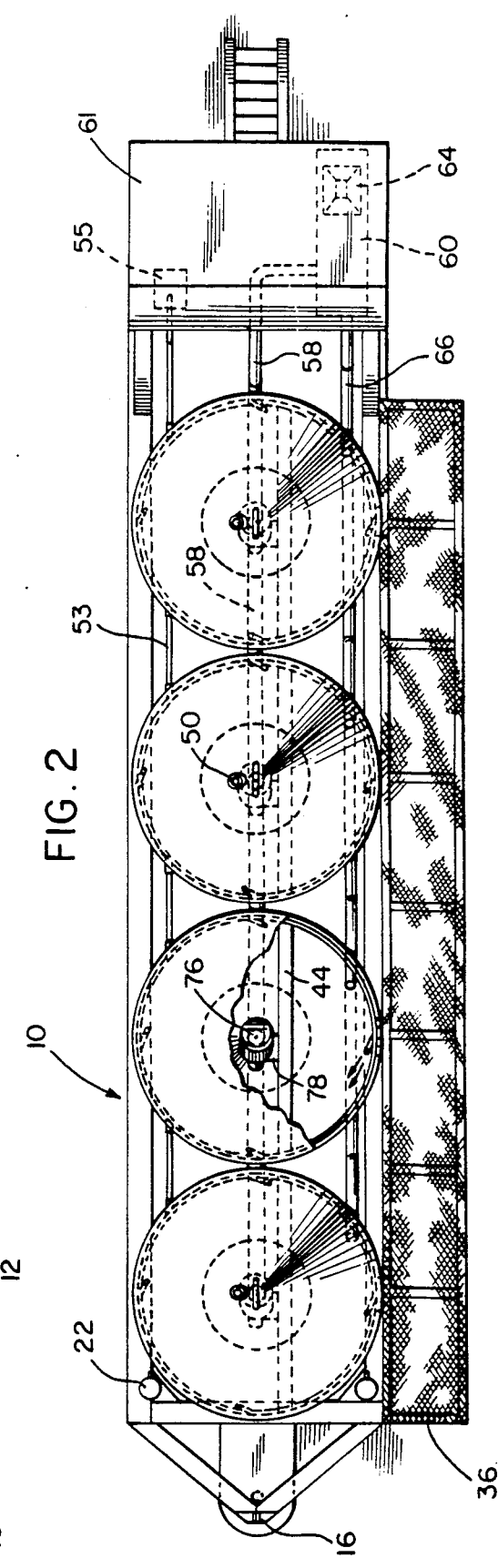

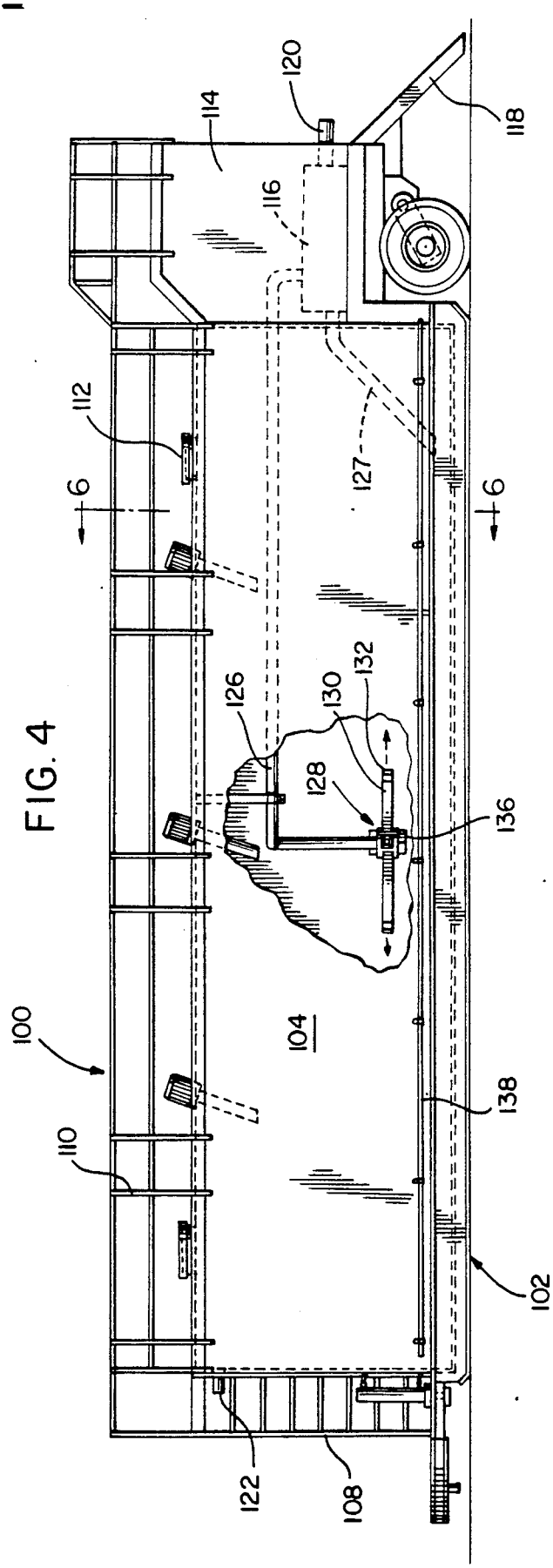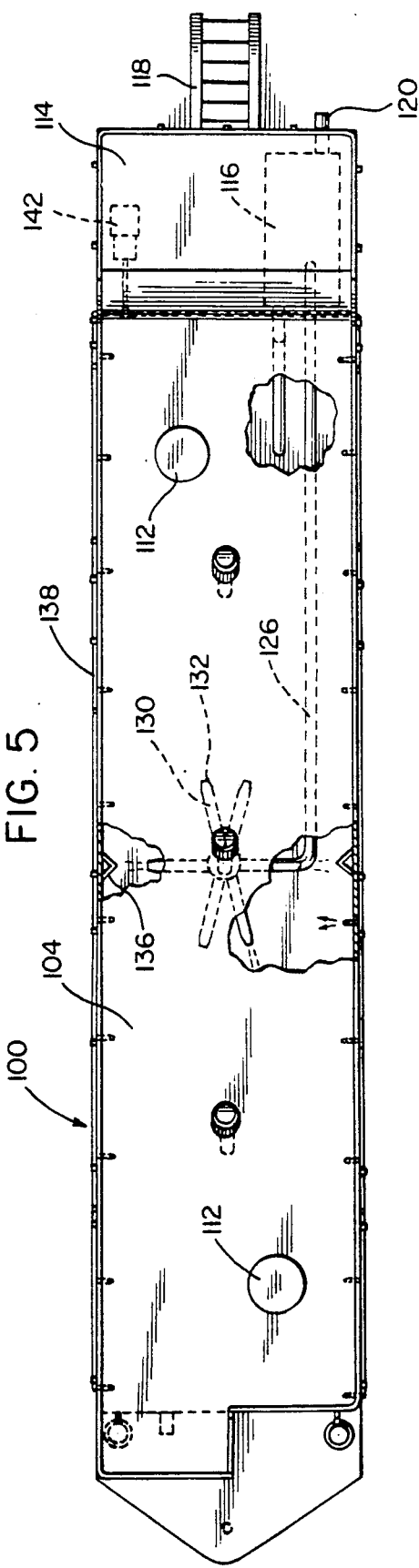

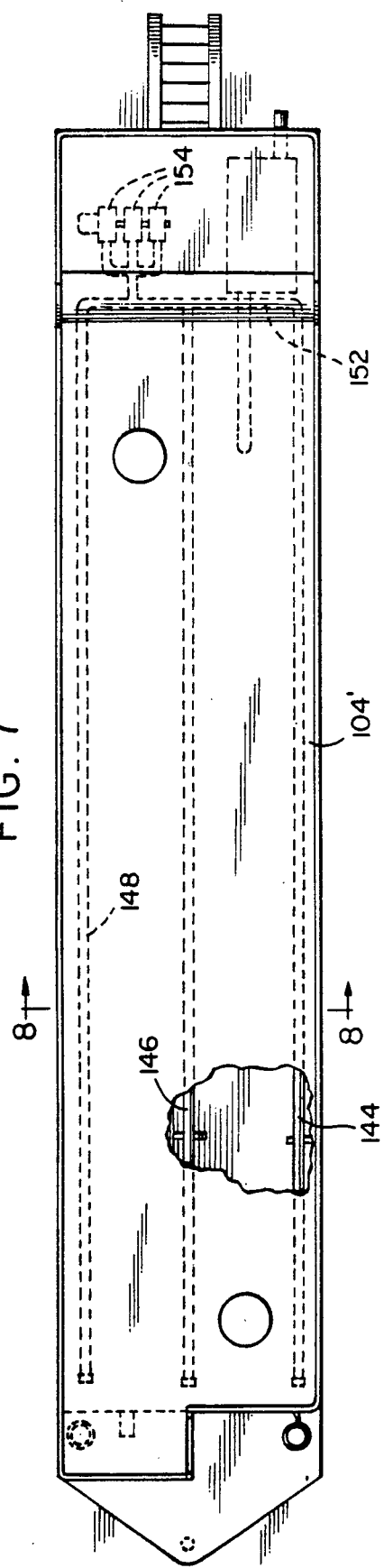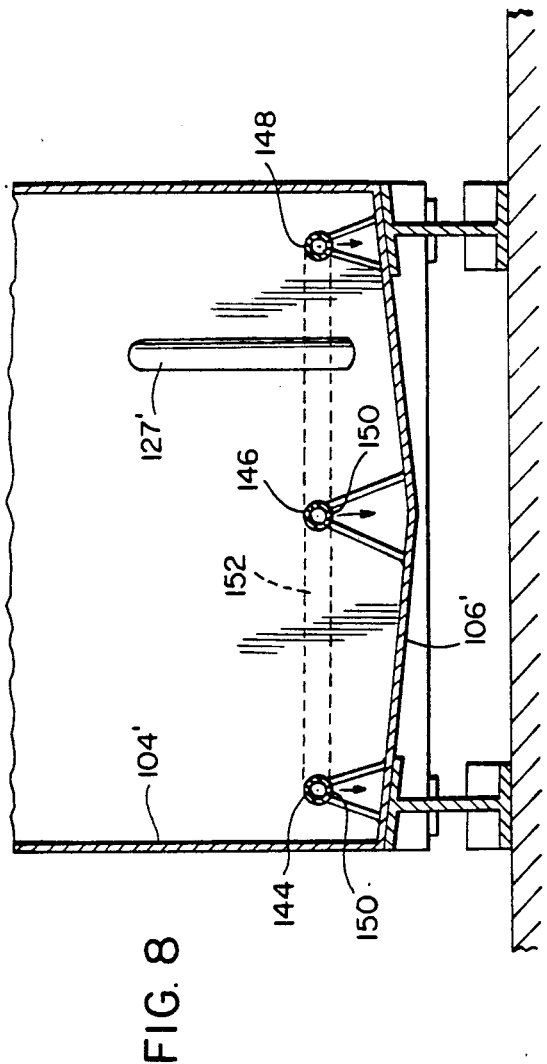

SOIL AND SLUDGE TREATMENT APPARATUS AND METHOD INCLUDING AGITATION, AERATION AND RECIRCULATION

BACKGROUND OF THE INVENTION

1. Field of the Invention

The present invention generally relates to a treatment apparatus and method and more specifically a mobile soil and sludge treatment apparatus and a method of treating soil and sludge useful in a soil washing process or a biological decontamination of soils and/or sludges. In one embodiment of the invention, a plurality of tanks are mounted on a vehicular trailer for over-the-road movement and each tank includes aerator/mixers and a plurality of peripherally arranged air jets with the mixing, aeration and air jets to prevent settling of the solids in the slurry during the process. In a second embodiment of the invention, single large tank is mounted on a vehicular trailer with the including aerator/mixers and a slurry pump for recirculating slurry throughout the tank with the recirculating pipes terminating in jet nozzles or eductors which enhance mixing and solids suspension. In a third embodiment, the aeration/mixing is obtained by a plurality of downwardly directed air jet nozzles adjacent the bottom of the tank. The apparatus and method efficiently maintain the suspension of solids in a slurry environment for enhancing solubilizing of contaminants from the solids and producing decontaminated soils.

2. Information Disclosure Statement

A method and apparatus for biological remediation using the liquid/solid contact process is disclosed in my prior U.S. Pat. No. 4,584,102 issued Apr. 22, 1986. The method or process disclosed that patent involves biological treatment of organic disclosed in a slurry system and is usually accomplished in large open or in-ground reactors. Sludges which contain high organic concentrations are best treated in large reactors while solids containing lower levels of contaminants tend to clog the system by settling out of the slurry. This results in decontamination being retarded in the settled precipitated material. Another problem arises during transfer from one tank to another is the easy removal of the liquid portion of the material which leaves the solids in the tank with final removal of the solids requiring mechanical or in some cases hand excavation. Various equipment is known to treat contaminated materials but none of the known apparatuses or methods are equivalent to this invention.

SUMMARY OF THE INVENTION

An object of the present invention is to provide an apparatus and method to produce fine particle slurries with the apparatus being capable of processing the slurry in a remedial washing or biological decontamination that is applicable to both high organic content sludges and high inert content solids or soils.

Another object of the invention is to provide a treatment apparatus and method as set forth in the preceding object in which the fine particle slurries of low solids content, not to exceed 50% solids, insuring intimate contact between the contaminated material and the remedial liquid medium with the apparatus maintaining adequate suspension of solids through mixing, air induced agitation and slurry transfer in a single cell or tank or between multiple cells or tanks with an oxygen rich environment being provided by air injection and the aerators thereby assisting in biological decontamination of soils and sludges.

A further object of the invention is to provide an apparatus and method in accordance with the preceding objects in which the apparatus includes a plurality of vertically oriented tanks each of which has an inverted cone bottom with each tank also including a mixer/aerator and air jets arranged peripherally of the tank adjacent the bottom.

Still another object of the invention is to provide an apparatus and method in accordance with the preceding objects in which a single large tank is employed in which top suspended or bottom positioned mixer/aerators are positioned to provide uniform mixing and aeration with a circulating slurry pump circulating slurry throughout the tank by an internal piping system in which the pipes terminate in jet nozzles or eductors for enhancing the mixing and solids suspension.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the apparatus of the present invention illustrating the embodiment of the invention including four vertically disposed tanks.

FIG. 2 is a top plan view of the construction of FIG. 1.

FIG. 4 is a side elevational view, with portions broken away, illustrating the embodiment of the invention including a single large tank.

FIG. 5 is a top plan view of the structure in FIG. 4.

FIG. 7 is a plan view similar to FIG. 5 but illustrating an alternative aeration/mixer system.

FIG. 8 is a transverse sectional view of the embodiment of FIG. 7 illustrating the position of the aeration/mixer pipes in the tank.

DESCRIPTION OF THE PREFERRED EMBODIMENTS

Figure 3:
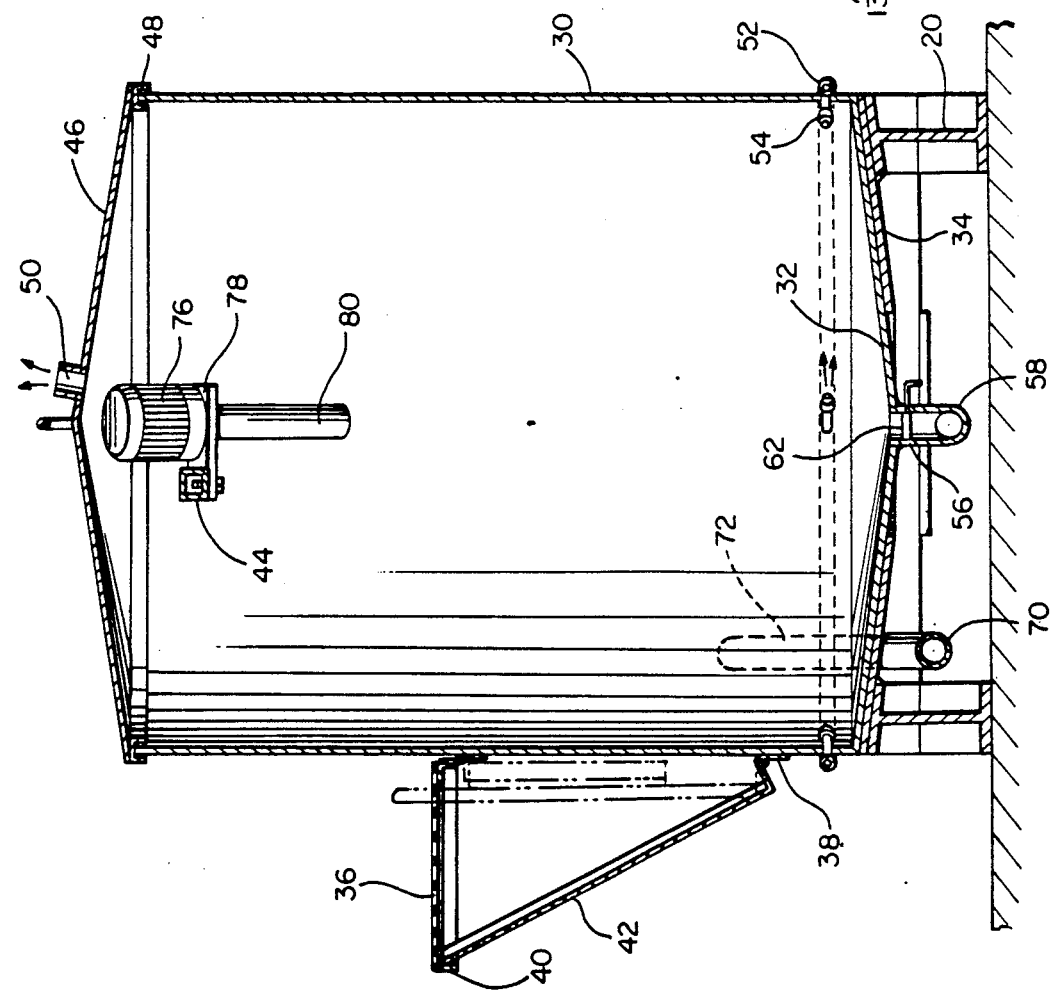
FIG. 3 is a transverse, sectional view taken substantially upon a plane passing along section line 3—3 on FIG. 1 illustrating the construction of one of the tanks and the association of the components therein.

Referring to FIGS. 1-3, the soil and slurry treatment apparatus is generally designated by reference numeral 10 which includes a vehicular trailer 12 which includes an elongated chassis or frame 14 provided with a hitch 16 at the forward end thereof and supporting wheels 18 at the rear by which the trailer 12 can be rested on a supporting surface when the wheels 18 are elevated and the frame 14 lowered or move over-the-road for transport to a treatment site when the wheels 18 are lowered and the hitch 16 connected to a towing vehicle in a well-known manner. The trailer 12 is similar to the chassis used in a conventional fractionation tank used in oil field applications and consists of two I-beams 20 which rest on the ground when the unit is in operation and loaded with the wheels 18 being elevated out of contact with the ground during operation. Other structures may be used such as a unit having removable wheels and axles and the hitch 16 may be of conventional construction including a pin which engages a fifth wheel on a towing tractor. Raising the front of the trailer to engage the fifth wheel raises the I-beams off the ground and pivots the wheels to contact the ground in a well-known manner and each I-beam will have a built-in hydraulic jack 22 to facilitate coupling and decoupling of the hitch 16 from a trailer for transport.

The trailer 12 includes four cylindrical tanks 24, 26, 28 and 30 preferably constructed of high density polyethylene but also capable of being constructed of metal or other plastics. The tanks are arranged in longitudinal alignment and, as illustrated in FIG. 3, each of the tanks includes an inverted conical bottom 32 with the lower central portion of the bottom 32 being centrally located between the I-beams 20. Each of the tanks is of cylindrical construction and preferably 8' in diameter and between 10' and 11' in height and capable of holding 4,000 to 5,000 gals. of liquid or slurry material. Each tank rests on a circular metal plate 34 in the form of a flattened doughnut which is attached to the I-beams 20 and supports the weight of the tank and its contents with each tank having a total weight between 40,000 and 50,000 lbs. when fully loaded.

A folding catwalk 36 extends along one or both sides of the trailer and is attached to angle iron supports 38 with each catwalk being approximately 2' wide, constructed of steel mesh or expanded metal with an angle iron peripheral frame 40 capable of supporting at least 300 lbs. The catwalk 36 may be hingedly supported approximately 4' from the top of the tank and can swing down flat along the tank for transport with angle iron braces 42 supporting the catwalk 36 in operative position and enabling the catwalk 36 to be pivoted to a vertical stored position for transport.

Each of the tanks is provided with a brace 44 (see FIG. 2) which extends transversely of the tank and generally diametrically thereof although offset from the center with the brace being countersunk into the upper edge of the tank to maintain its position and provide a smooth upper surface at the top edge of the tank to insure a positive seal between the tank and a cover 46 which controls emissions. The cover 46 is an 8' diameter polyethylene cone which rests on the top lip of the tank and includes a U-shaped edge 48 which faces downwardly and straddles the tank lip to provide a positive seal with the inside of the U-shaped edge 48 including a resilient material to insure the integrity of the seal. A hole 50 in the peak of the cover allows for withdrawal of emissions that can be vented to appropriate pollution control equipment.

Each of the tanks is also girdled by a peripheral air line 52 adjacent the cone bottom 32 with a plurality of air injectors 54 extending into the interior of the tank with the primary purpose of air entering the injectors being to prevent accumulation of solids in the crease or juncture between the side wall of the tank and the bottom 32 and along the bottom 32 of the tank. Four or more injectors 54 are provided to prevent settling with the air lines 52 being connected by pipes 53 to a low pressure, high volume blower 55 at one end of the trailer so that all of the tanks are provided with air jets which eliminate settling and accumulation of solids and also provides minimal aeration.

Each tank also includes an opening 56 in the bottom peak of the cone bottom 32 which is an outlet or take-out from the bottom of the tank with a pipe 58 extending longitudinally of all of the tanks and being connected to the take-out point with the pipe 58 extending longitudinally to a slurry/sludge pump 60 located in a housing 61 which also receives blower 55. Each take-out line 56 includes a valve 62 to control the take-out volume from each tank with the take-out line 56 being oriented at a 45° angle to enhance the flow of solids from the center of the cone bottom 32 into the line 58 which extends to the pump 60. The pump 60 may be provided with a hopper 64 which can discharge additive material into the slurry line 58 through a control valve prior to the slurry entering the pump 60. Additives may include various materials including emulsifiers, nutrients, pH adjustments, bacteria, cometabolites or other additives. A sample take-off controlled by a valve may be provided for the outlet of the pump to determine the content of the slurry being returned to the tanks through a manifold pipe 66 which extends longitudinally of the trailer as a pipeline 70 which has 45° branches 72 which angles up to the side of a point below the working volume of each tank with the branches terminating in an injection port 74 with a valve controlling the flow of slurry to each injection port. The slurry pipeline 70 extends to the rear of the trailer where a valved take-off leads to a dewatering trailer. Also, the take-out line 58 runs directly under the tanks and extends to the rear of the trailer where incoming slurry can be introduced to the unit with the incoming slurry passing through the line 58 into the pump 60 and then to the appropriate tank 24, 26, 28 and 30. The take-out line 58 and the return line 70 and appropriate valves allow the transfer of slurry from the pretreatment process to the tanks and the same system can be used for intra-cellular transfer as well inter-cellular transfer and also transfer from the treatment unit to a dewatering apparatus.

Aeration and mixing of the material in the tank is provided by a suspended aerator mixer 76 supported by brackets 78 supported from brace 44 and which includes a depending pipe and propeller 80 by which the slurry may be mixed and aerated in each tank.

Figure 6:
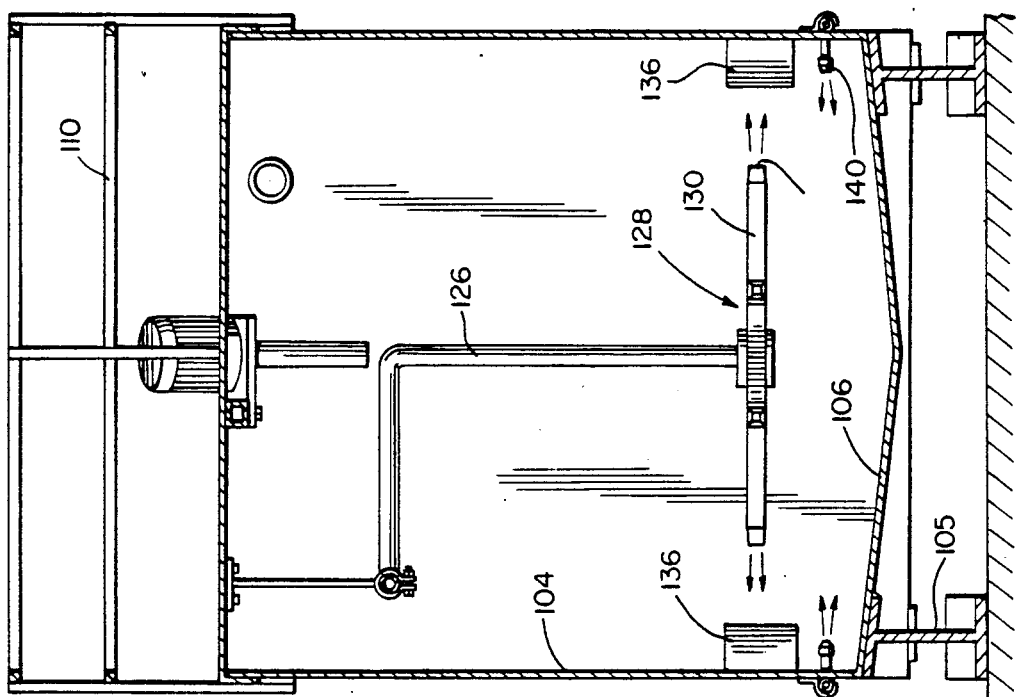
FIG. 6 is a transverse, sectional view taken substantially upon a plane passing along sectin line 6—6 on FIG. 4 illustrating further structural details of this embodiment of the invention.

Referring now to FIGS. 4-6, another embodiment of the invention is generally designated by reference numeral 100 and which includes a basic trailer unit 102 similar to that employed in FIGS. 1-3 insofar as the chassis, rear wheels, pin for engaging the fifth wheel of a towing vehicle and hydraulic jacks are concerned. In this construction, a single elongated tank 104 is mounted on I-beams 105 and includes a shallow V-shaped bottom 106 with the chassis resting on the ground when the apparatus is in use. The tank 104 may be 8' wide, 8' high and 40' long and will hold approximately 20,000 gals. The dimensions may vary depending upon the operational requirements of the system.

Exteriorly, the tank 104 includes a vertical ladder 108 which provides access to the top of the tank 104 which includes side rails 110 along each side thereof and across the ends with the top wall of the tank including an access port 112 and a housing 114 which encloses and houses a slurry circulating pump 116 with a ladder 118 providing access to the pump housing 114 with an inlet/outlet 120 being provided for the slurry pump 116. A vent 122 is provided at the upper end of the tank 104 remote from pump 116 for emission control with an appropriate emission control device being connected with the vent as required.

A plurality of aerator/mixers 124 extend above the top wall and penetrate the top wall to interact with the liquid/slurry inside the tank 104. The slurry circulating pump 116 and other system controls are housed within the housing 114 with a valve directing slurry flow into the circulation system return line 126. The aerator/mixers 124 extend through the top wall into the slurry and effectively suspend the bulk of the solids in the slurry. A return line or inlet line 127 extends from the bottom portion of the shallow V-shaped bottom 106 to the pump 116 so that slurry is pumped off the bottom of the tank to the slurry pump, 116 which recirculates the slurry back to the tank by the return line 126. The return line 126 branches into a multiple discharge assembly 128 which includes a plurality of radially extending arms 130 of different lengths with each of the arms being hollow and provided with a jet nozzle or eductor 132 at the outer end thereof. As illustrated, the arms 130 differ in length and six hollow pipes or arms are utilized and located generally at the center of the tank 104 with spray nozzles including one nozzle directed toward each corner of the tank and two nozzles directed toward opposite side walls of the tank 104. Each side wall of the tank 104 includes a vertically disposed deflector baffle 136 mounted thereon in alignment with nozzles 132 directed toward the opposite side walls. The baffle is V-shaped in cross-section with the apex disposed inwardly of the tank to protect the walls from spray erosion. This circulating system will cause the slurry to flow forcibly across the bottom of the tank and stir and mix any settled material and this line will also be used to load the system with a fresh charge of material through inlet/outlet 120 and pump 116. The slurry pump 116 can also be switched by a valve to pump the slurry out of the tank by inlet/outlet 120 to a dewatering system or subsequent treatment apparatus. The tank 104 also includes an air line 138 along each side wall with air nozzles or injectors 140 extending inwardly into the tank 104 adjacent the juncture between the side walls and bottom 106. A blower 142 in housing 114 is communicated with the air lines 138.

The above-described appratuses are designed to facilitate suspension and transfer of solids in a slurry based decontamination process. The combination of the tank or tanks mounted on a low-boy trailer and provided with high energy mixing and aeration will prevent settling of solids during the decontamination process. A pretreatment process as well as a posttreatment process may be associated with the equipment to eliminate large product particles and/or agglomeration. The pretreatment process includes a power screen/shaker capable of removing larger rocks with a ½" to ¾" diameter as the upper limit of material passing the screen. The process of the apparatus disclosed in this application takes the prescreened material, introduces liquid to generate a slurry and processes the slurry to a uniformly fine particle size for introduction into the apparatus. The slurrying process is initiated by screening the contaminated material in a power shaker and then slurried in a pugmill, mobile cement mixer or other slurrying system. The slurry is then run through a grinder to insure a uniformly fine stream with this pretreatment process pulverizing clods, especially in clay based soils. This process tends to prevent agglomeration and the resultant fine slurry is highly amenable to the subsequent decontamination process.

The tanks of the embodiment of the invention illustrated in FIGS. 1-3 are preferably constructed of a chemically resistant polymer such as high density polyethylene which provides durability due to resistance to erosion and the contaminants do not adhere to these materials in significant amounts and thus is superior to steel in some respects and maintains an additional advantage of being unaffected by corrosive environments.

Each tank is connected to a manifold used to circulate the slurry in each tank, or transfer the slurry between tanks and the manifold is also used to load and evacuate the tanks or cells. All corners of the manifold are limited to 45° to eliminate restrictions which would tend to enable solids to settle out. The slurry/sludge pump effects all slurry transfers and is communicated with the take-out line at the bottom of each tank at the peak of the inverted cone with a valve immediately outside of the tank controlling flow out of the tank into the manifold and thus from the tank into the manifold to the pump and back to the series of tanks. The manifold has individual branches leading to each tank with the inlets positioned above the base of the inverted cone and below the working level of the tank with injections of slurry into the tank being below the liquid surface. Partial in-tank mixing is provided by a series of air jets girdling the tank at the base of the cone with these air jets being connected to an air compresser or other source of compressed air by a manifold with the jets being angled or tangentially arranged around the circumference of the cell or tank to prevent a buildup of solids in the crease and around the bottom of the tank. The bulk of the mixing is provided by a motor driven propeller mixer suspended from the top of the tank by a mount that transverses the diameter of the tank or the mixer can be attached to the side of the tank by a suitable bracket in an alternate arrangement.

Aeration of the slurry is carried out by a commercial aerator utilizing an air injection process and minimal oxygen transfer levels must exceed 2 lbs. per hour per horse power of the motor driven mixers. A combined mixer/aerator unit may be used or independent mixers and aerators may be used with these units producing acceptable dissolved oxygen levels and mixing efficiency. Volatile emissions are controlled as required by the lid or cover with emissions being extracted through vents in the top of the lid and routed to appropriate pollution control equipment. The tank units can be built on fixed skids for permanent installation but are preferably mounted on a trailer for mobile operations with the wheels either being permanently connected to the trailer in a manner to enable them to be elevated or lowered or detachably mounted to the trailer to enable them to be removed when setting up the trailer with the I-beams supported on the ground surface.

The system is specifically applicable to slurrying of soils and sludges for remediation purposes and produces fine particle slurries of low solids content of up to 50% solids with these slurries insuring intimate contact between the contaminated material and the remedial liquid medium. The apparatus maintains adequate suspension of solids through mixing, air induced agitation and slurry transfer both within a single tank and between tanks on a multiple tank unit. An oxygen rich environment is provided by air injection and the aerator which functions are particularly crucial in biological decontamination of soils and sludges. The additive hopper is available for addition of treatment components, additional solvents and the like.

In the embodiment illustrated in FIGS. 4-6, the bulk of the mixing is provided by the motor driven, propeller mixer/aerator suspended from the top of the tank with mixing and maintenance of the suspension being enhanced by the pumping of slurry through the internal piping system terminating in the 6-armed rose tipped with eductors with the jet action of the slurry leaving the eductors aiding in suspension of solids. Aeration of the slurry is carried out by the mixer/aerators which operate on an air aspiration principle and minimal oxygen transfer levels must exceed 2 lbs. per hour per hp. with levels in excess of that minimum being preferable. The number of mixer/aerators in the tank may vary depending upon the oxygen and mixing requirements. The fine particle slurries insure intimate contact between the contaminated material and the remedial liquid medium and maintains adequate suspension of solids through mixing and slurry transfer by the eductor system with an oxygen rich environment being provided by the aerator which is crucial in biological decontamination of soils and sludges. Any required nutrients will be added in the treatment process with such nutrients including commercial fertilizer providing nitrogen and some phosphate although most soils contain adquate phosphorous levels without enhancement. A polishing step may be provided along with an additional carbon source. Molasses may be added as the additional carbon source.

FIGS. 7 and 8 illustrate an alternative aeration/mixing system which can be used in lieu of the aeration/mixers 124 used in FIGS. 4-6. The same reference numerals are used for the same structural components except that the numerals are primed in FIGS. 7 and 8. In this system, the tank 104' includes three parallel pipes 144, 146 and 148 extending longitudinally along the bottom 106' or floor of the tank with the two outer pipes 144 and 148 positioned in the outer bottom corners thereof and the other pipe 146 positioned in the center of the "V" in the bottom. All of the pipes are spaced just above the floor and include a plurality of apertures 150 in the bottom surface thereof to form jet nozzles for discharge of air downwardly toward the bottom or floor. The pipes 144, 146 and 148 are connected by a manifold 152 at one end thereof which extends through housing 114' and is communicated with the discharge of three low pressure, high volume blowers 154.

The downwardly discharging nozzles 150 provide downwardly moving air jets which swirl or "boil" the water for thorough agitation thereof in order to more effectively suspend the solids in the slurry and also to provide oxygenation for biodegradation.

Auxiliary equipment is employed in pretreatment processing and posttreatment processing with the pretreatment equipment including a power shaker/screen and a hammermill or equivalent equipment may be used to pulverize clods if they exist after screening. The screened material is then slurried in a pugmill, slurry mixer, cement mixer or similar mixing device. A grinder is used in the flow line of material to grind the slurry into a fine consistency. The fines slurry is then pumped by the slurry/sludge pump 60 or 116 into the tanks through the pipeline 58, 66 or 126 for introduction into the tanks of FIG. 1 or the tank of FIGS. 4-8.

Posttreatment equipment includes a dewatering system that initially includes a series of decreasing diameter hydrocyclones which empty onto a filter belt which removes water by gravity or may be vacuum assisted with the final dewatering step employing a centrifuge or press-type filter. The pretreatment and posttreatment equipment components are commercially available and may be assembled on the treatment trailers or on separate trailers as may be necessary or appropriate.

The decontamination process or remediation process which utilizes the apparatus disclosed includes the following steps but is not necessarily limited only to these steps. Initially, the contaminated material such as soil or the like is excavated. The excavated contaminated material is then power screened with the equipment including a hammermill or similar structure and a power shaker capable of producing materials with a diameter or major dimension smaller than ⅜" thus producing a fine material. The fine material is then slurried in a pugmill, cement mixer or similar device which mixes water containing large bacterial population with decontaminated material. A slurry grinder mounted in-line with the slurrying system provides final pulverization of the slurry. The pulverized slurry is then introduced into the treatment unit by the use of a slurry/sludge pump on the pretreatment unit which pumps the slurry into the take-out line 58 in the embodiment illustrated in FIGS. 1–3 with the slurry passing under the four tanks 24, 26, 28 and 30 to the slurry/sludge pump 60 on the treatment unit. This slurry is then pumped into the tanks through the return line 70. In the single tank embodiments illustrated in FIGS. 4–8, the slurry is pumped directly into the tank for continued mixing and aeration.

Chemical additives for enhancing treatment can be added directly to the tanks in FIGS. 1–3 or to the pipeline through the hopper as the slurry is being pumped and distributed. Chemical additives can be added to the embodiments of the invention illustrated in FIGS. 4–8 by introduction in the recirculating pipeline. The additive chemicals include but are not limited to bacterial cultures, emulsifiers, pH adjustments, water, nutrients, cometabolites and any other desired treatment enhancement materials.

The slurry being treated is mixed on three levels by high energy agitation. The first mixing or agitation is a direct mixing provided by the motor driven, propeller mixer or mixers with these units being appropriately powered by a 3 to 5 hp. motor. The mixer or mixers are suspended from a bracket suspended from the top of the tank with the unit illustrated in FIGS. 4–6 including three, four or more mixers.

The crease or juncture where a sidewall and bottom of a tank meet includes a second level of agitation or mixing inasmuch as the crease is swept clean by air injected by air nozzles mounted in the walls of the tank with the air nozzles discharging air tangentially to the sides of the tank. The number of nozzles may vary from four to eight and are spaced equally around the circumference of the tank. In the embodiment illustrated in FIGS. 4–8, the single tank crease is swept clean by the 6-armed rose tipped with jet nozzles.

The third level of mixing or agitation is produced by intra-cellular transfer of the slurry. The take-out valve for a tank is opened and the return line valve of the same tank is opened and the slurry/sludge pump then pumps slurry out the bottom of the tank through the take-out manifold to the pump and back through the return line to the original tank. Any precipitated material is thereby resuspended in the mixed slurry. In the embodiment illustrated in FIGS. 1–3, the slurry pump periodically circulates the slurry through the jet nozzles to maintain solids in suspension.

Inasmuch as dissolved oxygen is essential to biological processes, primary aeration is an air injection aerator suspended from the bracket which supports the mixer with the air injection aerator preferably being in the form of a 5 hp. aerator capable of dissolving a minimum of 10 lbs. of oxygen per hour. In addition, minimal dissolved oxygen levels are produced by the air injection nozzles used to maintain solids in suspension. In FIGS. 1-3, each tank is provided with an aerator and air injection nozzles, the embodiment illustrated in FIGS. 4-6 including four aerators and a plurality of air injection nozzles and the embodiment in FIGS. 7 and 8 including three blowers and three pipes with jet nozzles.

Additional mixing is obtained through inter-cell or inter-tank transfer which is accomplished in a manner similar to intra-cellular or intra-tank transfer previously described with the only alteration being opening the return line valve on a tank other than the one from which the slurry originated. In the single tank embodiments illustrated in FIGS. 4-8, inter-cellular transfer to other tanks or to other phases is controlled by a valve in the pumphouse. Final transfer from the treatment unit is accomplished by a similar sequence of operations as intra-tank or inter-tank transfer with the return line valve at the end of the unit being opened and the slurry being pumped to a dewatering unit.

In the dewatering unit, the composition of the treated matrix dictates the dewatering processes. Sand and gravel are easily dewatered by a hydrocyclone or a series of graduated hydrocyclones emptying onto a filter belt. However, a clay matrix may require the additional step of running the matrix through a centrifuge or filter press with the resulting material varying from moist soil to paste having a 20% to 30% moisture content which can be placed into an appropriate storage tank, bin or other repository.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An apparatus for maintaining slurried solids in suspension, aerating said slurry and transferring said slurry into the apparatus, within the apparatus and out of the apparatus comprising at least one tank having a bottom wall, said bottom wall having inclined upper surface areas, means for receiving a quantity of slurry for treatment, said quantity having an upper portion, slurry mixing means including air injectors for injecting adjacent the bottom wall of the tank, and aeration means comprising an injection aerator for injecting air into the upper portion of the quantity of slurry in the tank to dissolve oxygen into the slurry, pipe means for circulating slurry into and out of the tank and slurry pump means to enable the slurry to be recirculated in relation to the tank, introduced into the tank and removed from the tank, and means supporting the tank including an elongated mobile trailer having a hitch at one end and vertically adjustable wheel means at the other with the wheel means being operable to support the trailer above ground surface during over-the-road movement and enable the trailer to be supported on the ground surface at a treatment site.

2. The structure as defined in claim 1 wherein said tank includes a single elongated tank extending substantially throughout the length of the trailer with the bottom wall of the tank being V-shaped, said pipe means being communicated with the bottom of the V-shaped bottom wall to remove slurry from the lowest point in the tank for circulation through the pump means, said pipe means also including a return pipe from the pump means to the tank for recirculation of the slurry.

3. The structure as defined in claim 1 further including a plurality of vertically disposed cylindrical tanks mounted in tandem aligned relation to said one tank on the support means, each of said cylindrical tanks including an inverted cone-shaped bottom with a low peak, said pipe means communicating with the low peak of each cylindrical tank bottom for transferring slurry to the pump means, said pipe means also including a return pipe to each of said cylindrical tanks for circulation of slurry to the tanks.

4. The structure as defined in claim 1 wherein said slurry mixing means maintains solids in suspension in the slurry and includes tangential air injectors adjacent the juncture between the bottom wall of the tank and the remainder of the tank to agitate and mix the slurry.

5. The structure as defined in claim 1 wherein said mixing means includes a motor driven propeller-type mixer having the propeller immersed in the upper portion of the slurry for maintaining solids in suspension in the slurry.

6. An apparatus for maintaining slurried solids in suspension, aerating said slurry and transferring said slurry into the apparatus, within the apparatus and out of the apparatus comprising at least one tank having a bottom wall, said bottom wall having inclined upper surface areas, means for receiving a quantity of slurry for treatment, said quantity having an upper portion, slurry mixing means including air injectors for injecting adjacent the bottom wall of the tank, and aeration means comprising an injection aerator for injecting air into the upper portion of the quantity of slurry in the tank to dissolve oxygen into the slurry, pipe means for circulating slurry into and out of the tank and slurry pump means to enable the slurry to be recirculated in relation to the tank, introduced into the tank and removed from the tank, said aeration means including a motor driven aspirating device capable of transferring oxygen into the slurry.

7. An apparatus for maintaining slurried solids in suspension, aerating said slurry and transferring said slurry into the apparatus, within the apparatus and out of the apparatus comprising at least one tank having a bottom wall, said bottom wall having inclined upper surface areas, means for receiving a quantity of slurry for treatment, said quantity having an upper portion with a surface level, slurry mixing means including air injectors for injecting adjacent the bottom wall of the tank, and aeration means comprising an injection aerator for injecting air into the upper portion of the quantity of slurry in the tank to dissolve oxygen into the slurry, pipe means for circulating slurry into and out of the tank and slurry pump means to enable the slurry to be recirculated in relation to the tank, introduced into the tank and removed from the tank, said pipe means including a return line from the pump means to the tank, said return line extending interiorly of the tank and terminating in a multi-armed discharge assembly below the surface level of slurry in the tank with each arm being hollow and provided with a discharge nozzle at the end thereof for discharging slurry into the tank below the level of slurry in the tank thereby agitating and mixing the slurry to maintain solids in suspension.

8. The method of treating and decontaminating a slurry comprising the steps of introducing a quantity of slurry having an upper portion into a tank means, agitating, aerating and mixing the slurry in the tank means by motor driven propeller mixing means and an aspirating aerator adjacent the upper portion of the slurry and agitating, aerating and mixing the slurry by air injection nozzles located tangentially near the bottom of the tank means and circulating and mixing the slurry in the tank means by removing slurry from the bottom of the tank means and reintroducing the slurry in the tank means at an elevated position.

9. The method as defined in claim 8 together with pretreatment steps including producing a fine particle slurry by power screening and shaking contaminated material which has been excavated, treating the screened material to separate rocks and other similar materials, pulverizing clods and slurrying the fine materials by a pugmill or similar device and discharging the fine slurry into the tank means and posttreating the slurry as required by dewatering through hydrocyclones, filter presses and centrifuges.

* * * * *